3,666,397
TRANSFER PRINTING WITH FIBRE-REACTIVE
DYES
Keshav V. Datye, Goregaon-Bombay, India, and Branimir
Milicevic, Riehen, and Hermann Werdenberg, Basel,
Switzerland, assignors to Ciba-Geigy AG
No Drawing. Filed Mar. 13, 1969, Ser. No. 807,104
Claims priority, application Switzerland, Mar. 22, 1968,
4,278/68; Jan. 21, 1969, 840/69
Int. Cl. D06p 1/38
U.S. Cl. 8—2.5
13 Claims

ABSTRACT OF THE DISCLOSURE

A dyeing or printing process wherein a natural or synthetic or semi-synthetic material, is kept in contact in the wet state, for 20 to 220 seconds, on one side with a support having a colour print produced with at least one fibre-reactive dyestuff with or without a disperse dyestuff and, on the other side, with a support heated to at least 100° C.

---

As disclosed in British specification 1,052,625 coloured print patterns produced with sublimable dyestuffs can be transferred from a support to anodically oxidized aluminum.

From French specifications 1,223,330 (Filatures Prouvost Masurel and Cie., Roubaix, France) and 1,334,829 (Imperial Chemical Industries Ltd.) it is further known that this transfer printing method can be used for dyeing synthetic materials, especially textile materials of linear polyesters. The transfer printing method, also known as dry-dyeing, according to which the dyestuffs are applied in vapor form to the dry material does not, however, produce acceptable prints on natural materials for example, wool and cotton. Furthermore, in order to achieve satisfactory, trouble-free transfers of the prints produced with sublimable dyestuffs from the support to the material finally to be printed, a very careful selection of the dyestuffs to be used is necessary; in fact, dyestuffs having very similar subliming properties must be chosen since otherwise the resulting prints are not sharp.

The present invention provides a process wherein natural or synthetic or semi-synthetic materials, especially textile materials of wool and/or cellulose, or mixtures thereof with synthetic textile materials for example, nylon and/or polyesters, are maintained in contact for 20 to 220 seconds in the wet state on one side with a support carrying colour designs consisting of fibre-reactive dyestuffs with or without disperse dyestuffs and on the other side with a support heated to at least 100° C.

The support for the dyestuffs used in the present process may be, for example, a thin metal foil, especially a thin aluminum foil, or more advantageously for reasons of economy, a paper or cellophane foil or a paper web. The dyestuffs in form of aqueous or organic-aqueous printing inks are applied to the said support in the manner generally used in paper-printing, if desired for the production of multicolour designs or patterns, and then dried. For the actual transfer printing the support thus printed is brought into contact with the wet material to be printed and maintained in contact for 20 to 220 seconds at a temperature of at least 100° C., whereby the designs or patterns printed on the support are transferred to the textile material to be printed. As a rule this can be achieved by heating for a short time (20 to 100 seconds) at a temperature from 105 to 120° C. under atmospheric pressure. Transfer printing can be carried out continuously on a heated cylinder or by means of a heated plate (electric iron or warm press).

It is advantageous to use an installation in which the wet material is heated from below, for example between two contacting cylinders, only the bottom cylinder being heated, or between a heated plate and an unheated cylinder resting on it which presses the printed support against the wet material.

As fibre-reactive dyestuffs suitable for printing the support there may be mentioned the water-soluble dyestuffs that contain methylolamide groups or replaceable substituents which can be fixed on cellulosic materials chemically, that is to say with formation of covalent chemical bonds.

Fibre-reactive groupings, that is to say reactive groupings capable of reacting with the hydroxyl groups of cellulose with formation of a covalent bond, are the chloromaleinylamino groups, the propiol grouping, the mono- and dichlorocrotonylamino groups, bromo- or chloroacrylamino groups, acrylamino groups, vinylsulphone groups and especially groupings containing a labile substituent which are easy to split with uptake of the electron bond pair, for example aliphatically bound sulphuric or thiosulphuric acid ester groups and aliphatically bound sulphonyl or sulphonyloxy groups or halogen atoms, especially an aliphatically bound chlorine atom. These labile substituents are advantageously in the α- or β-position of an aliphatic residue linked with the dyestuff molecule through an aminocarbonyl or aminosulphonyl group; in the case of those dyestuffs which contain halogen atoms as labile substituents, these mobile halogen atoms may also be present, for example, in an acetyl residue or in α- and β-position of a propionyl residue. Examples of such residues are for instance chloro- or α,β-dichloro- or dibromopropionylamino groups or α-chloroacetylamino groups. Preferably, however, the replaceable halogen atoms are present in a heterocyclic residue which preferably contains 2 or 3 cyclic hetero atoms, especially cyclic nitrogen atoms, for example in a phthalazine, pyridazine, pyridazone, quinoxaline, quinazoline, oxazole, thiazole or especially in a pyrimidine or a triazine ring, for example in a grouping of the formula

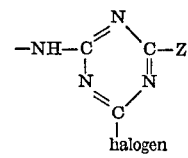

in which Z represents a hydrogen atom, an unsubstituted or substituted amino group, an etherified hydroxyl or mercapto group, a halogen atom, or an alkyl, aryl or aralkyl group. The halogen atoms may be, for example, bromine or preferably chlorine atoms. It is especially advantageous to use dyestuffs that contain the grouping of the formula

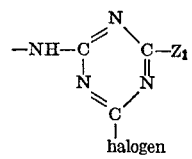

in which $Z_1$ represents a chlorine atom, an —$NH_2$ group or the residue of an aliphatic or aromatic amine, also those fibre-reactive groups whose replaceable substituent is more especially a quaternary ammonium or hydrazinium group linked with a carbon atom of a heterocyclic residue, for example a group of the formula

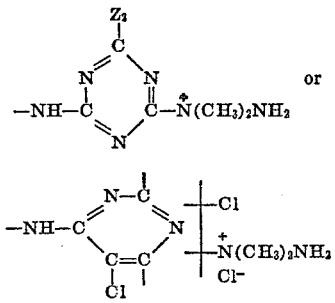

in which $Z_2$ represents a hydrogen atom, an unsubstituted or substituted amino group or an etherified hydroxyl or mercapto group.

A large selection of dyestuffs for use according to this invention is known. They can be manufactured by the usual methods, for example by acylating dyestuffs of a very wide variety, containing primary or secondary amino groups, especially those of the anthraquinone, phthalocyanine or azo series, with acylating agents that contain one or several reactive groups. As such acylating agents there may be mentioned, for example, the anhydrides or chlorides of the acids corresponding to the aliphatic acylamino residues mentioned above, for example of acrylic acid, propiolic acid, chloromaleic acid, chloroacrylic acid, $\alpha,\beta$ - dibromopropionic acid, or $\beta$-chloropropionylic acid and especially the halides corresponding to the heterocyclic reactive residues, that is to say for instance the following: 2 - halogenobenzthiazole- (or -oxazole-)carboxylic or sulphonic acid chloride, 3,6-dichloropyridazine - 5 - carboxylic acid chloride, tetrachloropyridazine, 4,5 - dichloropyridazon - (6) - yl-propionic acid chloride, 4,5 - dichloro - 1 - phenylpyridazone-carboxylic or -sulphonic acid chloride, 4,5-dichloropyridazone-propionic acid chloride, 1,4 - dichlorophthalazine-carboxylic or -sulphonic acid chloride, 2,3-dichloroquinoxaline-carboxylic or -sulphonic acid chloride, 2,4-dichloroquinazoline-carboxylic or -sulphonic acid chloride, 2,4,6 - trichloro- or 2,4,6 - tribromopyrimidine and their derivatives which contain, for example in 5-position, a cyano, nitro, methyl, ethyl, carbamide, sulphamide, carbomethoxy, carbalkoxy, acyl (for example benzoyl, acetyl or propionyl), alkenyl (for example allyl or chlorovinyl) or a substituted alkyl (for example carboxymethyl, chloromethyl or bromomethyl) group, 2,4,5,6-tetrachloro- or 2,4,5,6-tetrabromopyrimidine,
2,6-dichloro- or 2,6-dibromo-4-carbethoxypyrimidine,
2,4,5-trichloropyrimidine,
5-nitro-6-methyl-2,4-dichloropyrimidine,
2,4-dichloropyrimidine-6-carboxylic acid chloride,
2,4-dichloropyrimidine-5-carboxylic acid chloride,
2,6-dichloro or 2,6-dibromopyrimidine-4- or
 -5-carboxylic acid sulphonic acid amides or
 -4- or -5-carboxylic or -sulphonic acid chloride,
2,4-dichloropyrimidine-5-sulphonic acid,
2,4-dichloro-5-chloromethyl-6-methylpyrimidine,
2,4-dibromo-5-bromomethyl-6-methylpyrimidine,
2,4-dichloro-5-chloromethylpyrimidine,
2,4-dibromo-5-bromomethylpyrimidine,
2,5,6-trichloro-4-methylpyrimidine,
2,6-dichloro-4-trichloromethylpyrimidine and especially 2-methanesulphonyl-4,5-dichloro-6-methylpyrimidine,
2,4-dimethanesulphonyl-5-chloro-6-methylpyrimidine, 2,4,6-trichloro-1,3,5-triazine or
2,4,6-tribromo-1,3,5-triazine,
4,6-dichloro-1,3,5-triazines which are substituted in the 2-position by an aryl or alkyl group, for example a phenyl, methyl or ethyl group, or by the residue of an aliphatic or aromatic mercapto compound linked through the sulphur atom or hydroxy compound linked through the oxygen atom, or especially by an —$NH_2$ group or by the residue of an aliphatic, heterocyclic or aromatic amino compound linked through the nitrogen atom. As such compounds, whose residues can be bound with the triazine nucleus in 2-position by reaction with trihalogenotriazines there may be mentioned, for example: aliphatic or aromatic mercapto or hydroxy compounds for example thioalcohols, thioglycollic acid, thiourea, thiophenols, methanol, ethanol, isopropanol, glycollic acid, phenol, chloro- or nitrophenols, phenol carboxylic acid and sulphonic acid, naphthols, naphthol sulphonic acids and especially ammonia and compounds containing acylatable amino groups, for example hydroxylamine, hydrazine, phenylhydrazine, phenylhydrazine sulphonic acids, carbamic acid and its derivatives, semi- and thiosemicarbazides and -carbazones, methyl-, ethyl-, isopropyl-, methoxyethyl- and methoxypropyl-amine, dimethyl-, diethyl-, methylphenyl- and ethylphenyl-amine, chlorethylamine, ethanolamines, propanolamines, benzylamine, cyclohexylamine, morpholine, piperidine, piperazine, aminocarbonic acid esters, aminoacetic acid ethyl ester, aminoethane sulphonic acid, N-methylaminoethane sulphonic acid, and particularly aromatic amines for example aniline, N-methylaniline, toluidines, xylidines, chloranilines, p- and m-aminoacetanilide, nitroanilines, aminophenols, nitrotoluidines, phenylenediamines, toluylenediamines, anisidine, phenetidine, diphenylamine, naphthylamines, aminonaphthol, diaminonaphthalenes and especially anilines containing acid groups, for example sulphanilic, metanilic and orthanilic acid, aniline disulphonic acids, aminobenzyl sulphonic acid, aniline-$\omega$-methane sulphonic acid, aminodibenzoic acid, naphthylamine mono-, di- and tri-sulphonic acids, aminobenzoic acids, for example 1- or 2 - hydroxy - 5-aminobenzoic acid, aminonaphthol mono-, di- and trisulphonic acids, aminocarboxybenzene sulphonic acid; and coloured compounds or compounds having dyestuff characteristics, for example 4-nitro - 4' - aminostilbene disulphonic acid and aminoazo dyestuffs containing aminoanthraquinone or phthalocyanine residues which furthermore contain at least one reactive amino group.

The introduction of the triazine residues substituted in 2-position by the residue of a hydroxy, mercapto or amino compound or by ammonia can also be advantageously carried out by replacing one halogen atom in the chlorotriazine dyestuff obtained by condensation by reaction with one or several of the compounds mentioned above.

Furthermore, in the dyestuffs manufactured as indicated above, which contain a $\beta$-chloropropionyl, $\alpha,\beta$-dichloro- or -dibromopropionyl residue, this residue can subsequently be converted by dehydrohalogenation with an alkaline reagent into an unsaturated acyl residue, for example an acryl, chloroacryl or bromacryl residue, and such dyestuffs may also be used in accordance with the invention.

The water-soluble, fibre-reactive dyestuffs to be used according to the present invention may also contain the following fibre-reactive groups:

2-methylthio-4-fluoropyrimidine-5-carbonyl,
2,4-bis-(phenylsulphonyl)-triazinyl-6,
2-(3'-carboxyphenyl)-sulphonyl-4-chlorotriazinyl-6,
2-(3'-sulphophenyl)-sulphonyl-4-chlorotriazinyl-6,
2,4-bis-(3'-carboxyphenylsulphonyl-1')-triazinyl-6,
2-carboxymethylsulphonylpyrimidinyl-4, 2-methylsulphonyl-6-methylpyrimidinyl-4,
2-phenylsulphonyl-6-ethylpyrimidinyl-4,
2,6-bis-methylsulphonylpyrimidinyl-6,
2,6-bis-methylsulphonyl-5-chloropyrimidinyl-4,
2,4-bis-methylsulphonyl-pyrimidinyl-5-sulphonyl,
2-methylsulphonyl-pyrimidinyl-4,
2-phenylsulphonyl-pyrimidinyl-4,
2-trichloromethylsulphonyl-6-methylpyrimidinyl-4,
2-methylsulphonyl-5-chloro-6-methylpyrimidinyl-4,
2-methylsulphonyl-5-bromo-6-methylpyrimidinyl-4,
2-methylsulphonyl-5-chloro-6-ethylpyrimidinyl-4,
2-methylsulphonyl-5-chloro-6-chloromethylpyrimidinyl-4,
2-methylsulphonyl-4-chloro-6-methylpyrimidine-5-sulphonyl,
2-methylsulphonyl-5-nitro-6-methylpyrimidinyl-4,
2,5,6-tris-methylsulphonylpyrimidinyl-4,
2-methylsulphonyl5,6-dimethylpyrimidinyl-4,
2-ethylsulphonyl-5-chloro-6-methylpyrimidinyl-4,
2-methylsulphonyl-6-chloropyrimidinyl-4,
2,6-bis-methylsulphonyl-5-chloropyrimidinyl-4,
2-methylsulphonyl-6-carboxypyrimidinyl-4,
2-methylsulphonyl-5-sulphopyrimidinyl-4,
2-methylsulphonyl-6-carbomethoxypyrimidinyl-4,
2-methylsulphonyl-5-carboxypyrimidinyl-4,
2-methylsulphonyl-5-cyano-6-methoxypyrimidinyl-4,
2-methylsulphonyl-5-chloropyrimidinyl-4,
2-sulphoethylsulphonyl-6-methylpyrimidinyl-4,
2-methylsulphonyl-5-bromopyrimidinyl-4,
2-phenylsulphonyl-5-chloropyrimidinyl-4,
2-carboxymethylsulphonyl-5-chloro-6-methyl-pyrimidinyl-4,
2-methylsulphonyl-6-chloropyrimidine-4 or -5-carbonyl,
2,6-bis-(methylsulphonyl)-pyrimidine-4- or -5-carbonyl,
2-ethylsulphonyl-6-chloropyrimidine-5-carbonyl,
2,4-bis-(methylsulphonyl)-pyrimidine-5-sulphonyl,
2-methylsulphonyl-4-chloro-6-methylpyrimidine-5-sulphonyl or -carbonyl,
2-chlorobenzthiazole-5- or -6-carbonyl- or -5- or -6-sulphonyl,
2-arylsulphonyl- or 2-alkylsulphonylbenzthiazole-5- or -6-carbonyl or -5- or -6-sulphonyl, for example 2-methylsulphonyl- or
2-ethylsulphonylbenzthiazole-5- or -6-sulphonyl or -carbonyl,
2-phenylsulphonylbenzthiazole-5- or -6-sulphonyl or -carbonyl and the corresponding derivatives of 2-sulphonylbenzthiazole-5- or -6-carbonyl or -sulphonyl which carry sulphonic acid groups on the fused-on benzene ring, for example the 2-chlorobenzthiazole-5- or -6-carbonyl or -sulphonyl,
2-chlorobenzimidazole-5- or -6-carbonyl or -sulphonyl,
2-chloro-1-methylbenzimidazole-5- or -6-carbonyl or -sulphonyl,
2-chloro-4-methylthiazole-(1,3)-5-carbonyl or -4- or -5-sulphonyl residues, and the N-oxide of the chloro- or 4- nitroquinoline-5-carbonyl residue. Furthermore, the following residues may be mentioned:

2,2,3,3-tetrafluorocyclobutanecarbonyl-1- or -sulphonyl-1,
2-fluoro-2-chloro-3,3-di-fluorocyclobutane-1-carbonyl and
β-(2,2,3,3-tetrafluorocyclobutyl-1)-acryloyl,
α- or β-bromoacryloyl and α- or β-alkyl or -arylsulphonylacryloyl.

Particularly suitable are reactive dyestuffs containing halogenotriazinyl residues carrying phenoxy, alkoxy or alkoxyalkoxy residues with heterocyclic residues containing sulphonyl as the final groups and with fluorine-containing heterocycles as mentioned above.

When fibre mixtures containing a portion of synthetic fibres, especially polyester fibres, are to be dyed, disperse dyestuffs free from fibre-reactive groups as listed in the Colour Index may be used additionally.

As mentioned above, the dyestuffs can be applied in the manner indicated to the support which can then be used for transfer printing.

The materials to be dyed or printed according to the present process may be in the form of woven or knitted fabrics or fleeces (unwoven), or foils or films. Particularly suitable are woven or knitted cotton fabrics, viscose rayon and similar materials. Keratinic materials, for example silk or wool, do not generally need any special pre-treatment. Cellulosic materials for example cotton or viscose rayon are advantageously provided with the quantity of alkali required for fixing the fibre-reactive dyestuffs and, if desired, a catalyst, either separately or together with the quantity of water used to wet the material.

The water used for moistening the material can be replaced wholly or partially by an organic solvent. When alkalies are used, the solvent must be stable towards them.

As solvents which must be inert towards the textile material even at the dyeing temperature and which must not change the physical parameters of the fibres, the following for example, may be mentioned: the hydrophobic solvents which are not or at most only slightly miscible with water, for instance acetophenone, methylethylketone or, if desired, a halogenated hydrocarbon for example chlorobenzene or especially chloroform, carbon tetrachloride, tri- or tetrachloroethylene, 1,1,1-trichloroethane or dibromoethylene.

The water-miscible hydrophilic solvents comprise an especially preferred type of solvents, for example ketones, for example acetone, cyclohexanone or methylethylketone; aliphatic monohydric alcohols containing 1 to 4 carbon atoms, for example ethanol and the propanols, dioxan, tetrahydrofuran, glycerolformal and glycolformal, acetonitrile, tetrahydrofurfurylamine, pyridine and diacetone alcohol; high-boiling glycol derivatives for example the monomethyl, ethyl or butyl ethers of ethyleneglycol and diethyleneglycol monomethyl or monoethyl ether, thiodiglycol, polyethylene glycols insofar as they are liquid at room temperature; ethylene carbonate, γ-butyrolactone and especially the group of the water-miscible active solvents boiling above 120° C., for example N,N-dimethylformamide, N,N-dimethylacetamide, bis(dimethylamido)-methanephosphate, tris-(dimethylamido)-phosphate, N-methylpyrrolidone, 1,5 - dimethylpyrrolidone, N,N - dimethylmethoxyacetamide, tetramethylenesulphone (sulpholan), 3-methylsulpholan and dimethylsulphoxide.

The most advantageous procedure is to impregnate the cellulosic material to be dyed with an alkaline solution (for example in an alkaline bath or by padding), remove the excess of impregnating solution, for example by squeezing, and then press the resulting wet material together with the printed support between two cylinders, rolls or plates, especially metal plates, one of which is heated to at least 100° C.

After having removed the support the fixation of the dyestuffs on the printed material can be improved by subjecting the material to a steam treatment or thermofixation in the dry state. Any unfixed dyestuff residues and auxiliaries can then be washed out of the material.

According to the present transfer printing method there are obtained even on materials that are difficult to print by the conventional direct printing methods valuable prints whose fastness properties are equal to those otherwise obtainable with fibre-reactive dyestuffs.

Unless otherwise indicated, parts and percentages in the following examples are by weight. The relationship between parts by weight and parts by volume is the same as that between gram and millilitre.

EXAMPLE 1

For printing a viscose rayon fabric (viscose satin) with a red, an orange and a blue pattern printing inks are prepared from the following dyestuffs:

Red ink: Trisodium salt of the dyestuff of the formula [synthesis found in U.S. Pat. 2,979,498]

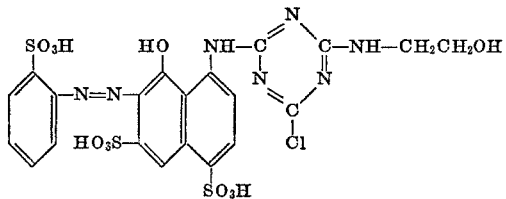

Blue ink: Sodium salt of the dyestuff of the formula [synthesis found in U.S. Pat. 3,133,921]

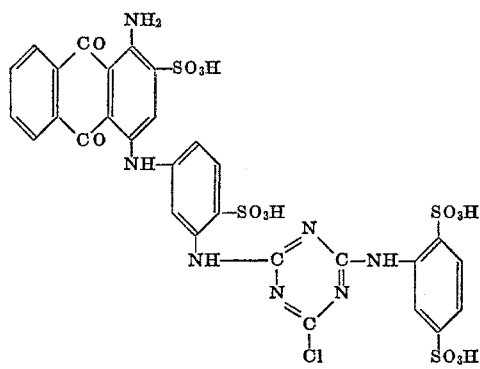

Orange ink: Trisodium salt of the dyestuff of the formula [synthesis found in U.S. Pat. 2,873,269]

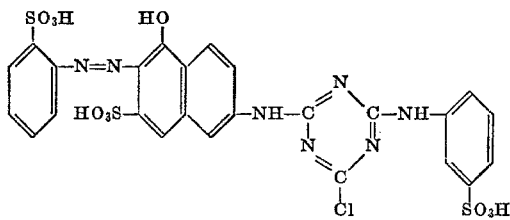

30 parts of the dyestuff together with 400 parts of 5% sodium alginate are dissolved in 1,000 parts of water, and the resulting ink is used for printing colour patterns on a paper web; the paper is then dried in a current of dry air at 100° C.

A wet viscose rayon fabric, which has been impregnated with a solution of 100 parts of urea, 10 parts of sodium bicarbonate and 2 parts of 2,2,2-bicyclodiazaoctane in 888 parts of water and then squeezed to a weight increase of 80%, is pressed together with the paper pirnted as described above for 60 seconds between a pair of metal plates of which one is cold and the other heated at 105° C. The paper is then taken off and the viscose rayon fabric steamed for 7 minutes at 100 to 103° C., any unfixed residues of dyestuff are washed off and the fabric is rinsed and dried.

Permanently fixed colour prints on the viscose fabric are thus obtained.

A similar result is obtained when a cotton fabric is used.

EXAMPLE 2

Colour patterns on cotton fabric are obtained by using high-glazed paper and the inks prepared from the following dyestuffs in the manner described in Example 1:

Yellow ink: Tetrasodium salt of the dyestuff of the formula [synthesis found in U.S. Pat. 2,945,021]

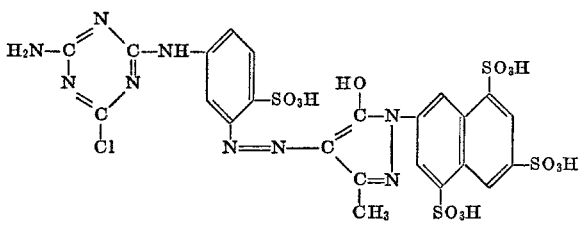

Scarlet ink: Trisodium salt of the dyestuff of the formula [synthesis found in U.S. Pat. 2,945,021]

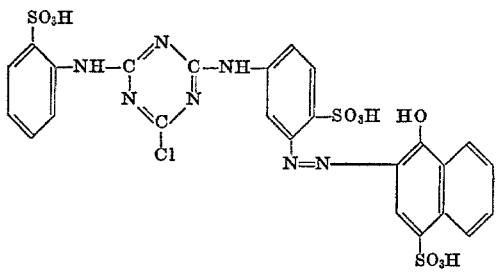

Violet ink: Trisodium salt of the dyestuff of the formula [synthesis found in U.S. Pat. 2,929,809]

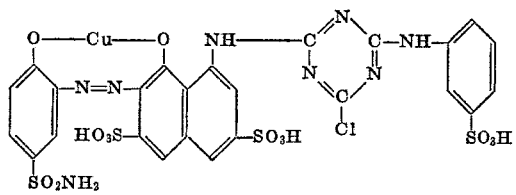

EXAMPLE 3

The paper printed according to Example 1, together with a wet wool fabric, which has been acidified with an aqueous, dilute solution of acetic acid (30 parts of 40% $CH_3COOH$ in 1,000 parts of water) is kept for 1 minute at 100° C. between a heated and a cold metal plate. The paper is removed and the fabric steamed for 15 minutes at 100 to 105° C., rinsed in cold and in warm water, after-treated with a cold, dilute solution of ammonia (2 cc. per litre) for 5 minutes, weakly acidified with dilute formic acid (1 cc. per litre), rinsed and dried. Fast print patterns are obtained.

EXAMPLE 4

A paper foil is printed in coloured patterns with solutions of 60 parts each of one of the dyestuffs shown in the preceding examples in 1,000 parts of water, and the printed paper is dried.

A cotton fabric is padded with the following mixture: 200 parts of urea, 160 parts of 5% sodium alginate thickener, 10 parts of sodium carbonate, 10 parts of meta-nitrobenzenesulphonic acid, 1 part of 40% sodium hydroxide solution in 1,000 parts of water. The wet cotton fabric under the printed paper is pressed for 1 minute on a metal plate heated at 140° C.

The paper is removed and the cotton fabric soaped, rinsed in cold and in warm water and dried. The resulting colour patterns are fixed in a permanent manner.

If desired, this process can be carried out continuously.

EXAMPLE 5

50 grams of the red dyestuff of the formula [synthesis found in U.S. Pat. 1,667,312]

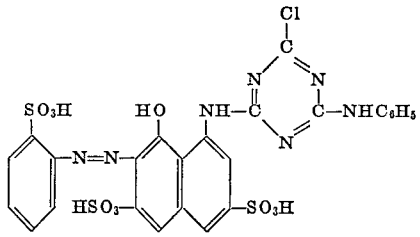

are added to a stock thickener prepared from 600 g. of water and 350 g. of 12% sodium alginate thickener on a high-speed stirrer. This printing paste is used for printing flat patterns on paper by means of a roll (engraved to 0.05 mm. depth) and the printed paper is dried. For transferring the printed pattern, the paper is brought into contact with a piece of bleached and mercerized cotton satin which has first been padded with a solution of 200 g. of urea, 160 g. of 5% sodium alginate thickener, 10 g. of potassium carbonate, 1 g. of sodium hydroxide solution 36° Bé., 10 g. of sodium metanitrobenzenesulphonate and 619 g. of water and then squeezed to a weight increase of 100%. The contact is made on a precision laboratory type ironing press, system BASF, operated under a pressure of 40 g./cm.$^2$ at 180° C., by loading with a cold stainless steel plate for 0.75 second. A deep red, uniform print of the pattern is obtained. When this fabric is steamed for 8 minutes in saturated steam at 101 to 103° C. or thermofixed for 3½ minutes at 150° C. and then washed at the boil, a print of usual tinctorial strength and good fastness properties is obtained. The above-mentioned ironing press has been described in the "Zeitschrift fuer die gesamte Textilindustries," volume 60 [1958], page 1,017.

EXAMPLE 6

When 120 g./kg. of the dyestuff of the formula [synthesis found in British Pat. No. 843,985]

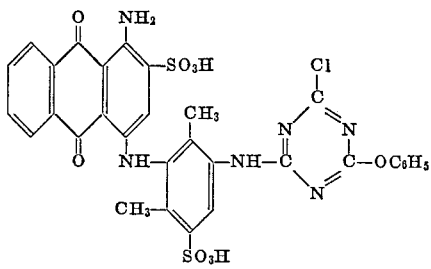

are used and proceeding otherwise according to Example 5, a practically optimal print is obtained by a mere washing at the boil. This cannot be appreciably improved even by 1 minute's steaming in saturated steam at 101 to 103° C. or 1 minute's thermofixation at 150° C. of the printed fabric after washing at the boil.

EXAMPLE 7

A printing operation carried out as described in Example 5 with the dyestuff of the formula [synthesis found in German Pat. No. 965,902]

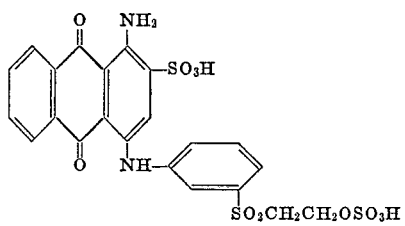

followed after the transfer without any subsequent fixing, by immediate washing at the boil also produces a blue dyeing of optimal tinctorial strength and good fastness properties.

EXAMPLE 8

The dyestuffs C.I. Reactive Blue 66, C.I. Reactive Red 80 and C.I. Reactive Yellow 52 are used for transfer printing on wet cotton fabrics as described in Example 1. The prints are thermofixed for 1 minute at 150° C. or steamed for 1 minute at 101 to 103° C., without previous washing. The thermofixed prints display good tinctorial strength.

EXAMPLE 9

80 grams of the dyestuff of the formula

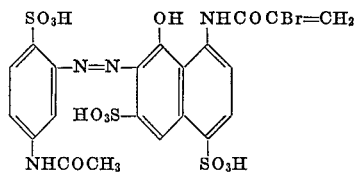

are stirred into a stock thickener prepared from 570 g. of water and 350 g. of 12% sodium alginate solution. The resulting paste is used for printing a flat pattern on paper by means of a roll (engraving 0.05 mm. deep) and the paper is dried. Mousseline de Laine is padded with a solution of 100 g. of urea, 100 g. of thiodiglycol, 10 g. of a salt of the acid sulphuric acid ester of an adduct of 1 mol of nonylphenol with 2 mols of ethylene oxide, 25 g. of 80% acetic acid and 765 g. of water and then squeezed to a weight increase of 100%. This fabric is brought into contact with the printed side of the paper by loading with a cold plate of stainless steel operating under a pressure of 40 g./cm.$^2$ for 6 seconds on a precision laboratory type ironing press, system BASF, at 140° C. A uniform, scarlet print is obtained. To completely fix the dyestuff, it is steamed for 5 minutes in saturated steam at 101 to 103° C., rinsed in cold water, washed for 10 minutes at 80° C. with 2 ml./litre of concentrated ammonia solution and 2 g./litre of an adduct of 1 mol of oleylamine and 8 moles of ethylene oxide, acidified, slightly soaped at 50 to 60° C. and once more rinsed in cold water. Steaming for 10 or 20 minutes does not improve the tinctorial strength; optimal tinctorial strength is obtained after steaming for only 5 minutes. The washed print is distinguished by excellent fastness properties.

EXAMPLE 10

Paper is printed wnth a flat pattern by means of a printing paste prepared from 60 g. of the dyestuff of the formula

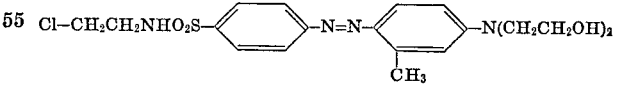

590 g. of water and 350 g. of 12% sodium alginate solution, using a roll engraved to a depth of 0.05 mm., and then dried.

Fabrics of mercerized cotton satin, polyester and polyester+cotton (67:33) are each impregnated with a solution of 870 g. of water, 100 g. of dioxan and 30 g. of sodium hydroxide solution 36° Bé. on a padder, squeezed to a weight increase of about 100% and successively kept in contact with the paper print at 180° C. on the precision laboratory-type ironing press system BASF according to Examples 5 and 9 for 0.5 to 1 second under 40 g./cm.$^2$ pressure.

On all fabrics orange-yellow prints are obtained. To complete the fixing of the dyestuff the prints are thermofixed for 1 minute at 200° C. and finally rinsed in cold and in warm water. The washed prints possess good general fastness properties.

What is claimed is:

1. A transfer printing process which comprises contacting a wet textile material comprising wool or cellulose, for from 0.5 to 220 seconds at a temperature of at least 100° C., with a transfer sheet comprising a support comprising an aluminum foil, a paper foil, a cellophane foil or a paper web having a decorative pattern printed thereon, said decorative print comprising at least one fibre-reactive dyestuff which does not sublime under the conditions of said process.

2. A process according to claim 1 in which the textile material is wetted with an organic solvent.

3. A process according to claim 1 in which the textile material is wetted with a hydrophilic solvent.

4. A process as claimed in claim 1, wherein a paper web or a cellophane foil is used as support for the dyestuff.

5. A process as claimed in claim 1, wherein a water-soluble fibre-reactive dyestuff is used.

6. A process a claimed in claim 5, wherein the support is printed with a water-soluble halogeno-1,3,5 - triazine dyestuff or with a fibre-reactive pyrimidine dyestuff.

7. A process as claimed in claim 5, wherein a fibre-reactive dyestuff is used that contains the fibre-reactive residue of an aliphatic acid containing 2 to 4 carbon atoms.

8. A process as claimed in claim 5, wherein a fibre-reactive dyestuff is used that contains a replaceable substituent, which is a sulphonyl, a sulphonic acid ester or an ammonium grouping or a halogen atom.

9. A process as claimed in claim 1, in which the textile comprises cellulose which has been wetted with an aqueous alkaline solution is printed.

10. A process as claimed in claim 1, wherein wool is printed.

11. A process as claimed in claim 1, wherein the wet material to be printed contains urea.

12. A process as claimed in claim 1, wherein the material to be printed is maintained for 20 to 220 seconds at 100 to 160° C. in contact with the printed support.

13. A process as claimed in claim 1, which is carried out continuously on a heated cylinder or by means of a heated plate.

References Cited

UNITED STATES PATENTS

| | | | |
|---|---|---|---|
| 748,604 | 1/1904 | Hesse et al. | 8—2.5 |
| 1,651,470 | 12/1927 | Sadtler | 8—2.5 |
| 1,729,347 | 9/1929 | Kirschenbaum | 8—2.5 |
| 2,472,466 | 4/1956 | Randall et al. | 260—249.5 |
| 2,911,280 | 11/1959 | Cicogna | 8—2.5 |

GEORGE F. LESMES, Primary Examiner

P. C. IVES, Assistant Examiner

U.S. Cl. X.R.

8—21 C, 21 B, 7, 163, 171, 172, 173, 175, 1 D, 1 E, 1 S, 1 UA, 1 B, 1 C, 1 L